April 30, 1968  J. T. LEIGHTON  3,380,472
GAS LIGHTER VALVE

Filed April 14, 1966   2 Sheets-Sheet 1

INVENTOR.
JOSEPH T. LEIGHTON
BY
ATTORNEY

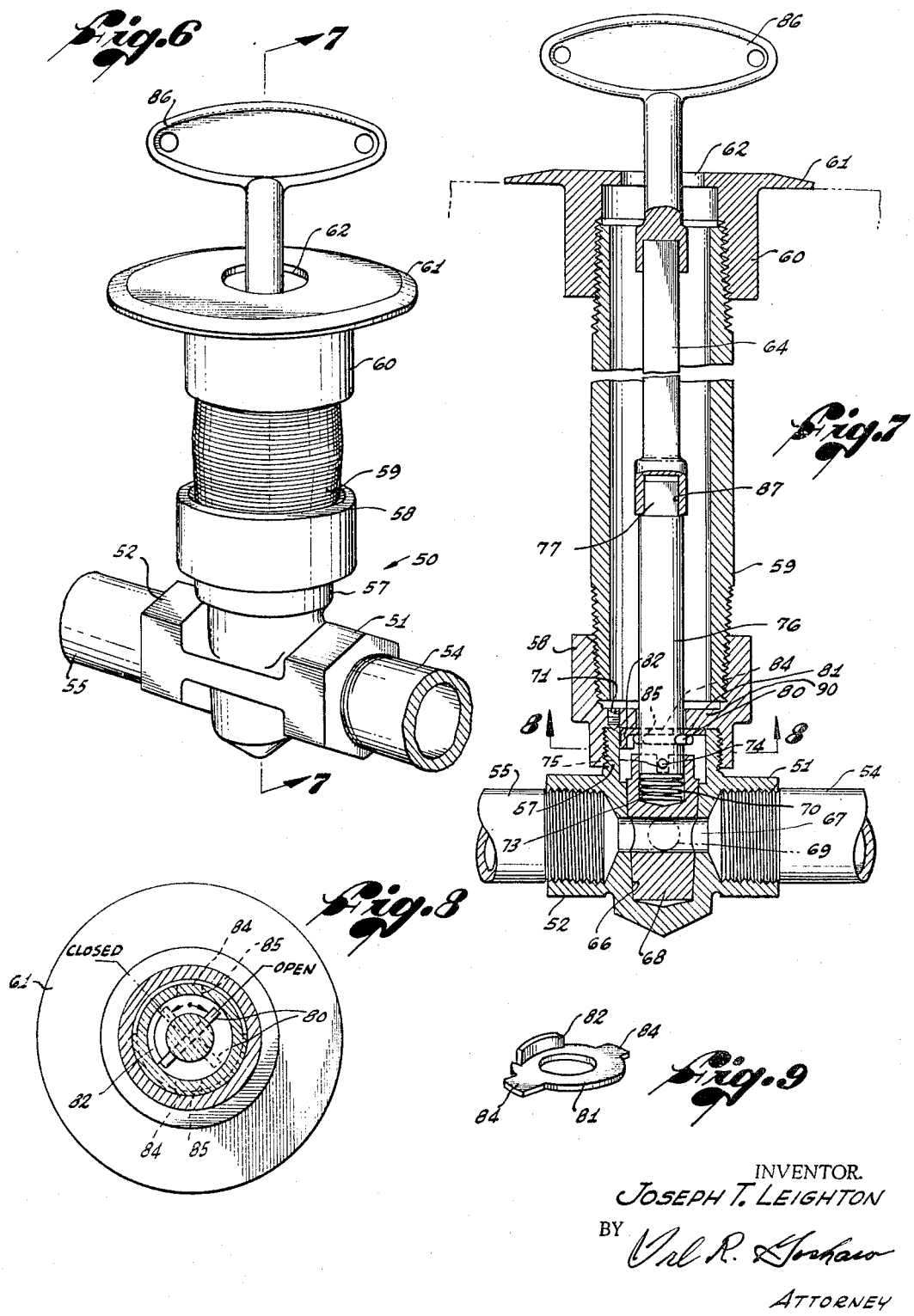

United States Patent Office 3,380,472
Patented Apr. 30, 1968

3,380,472
GAS LIGHTER VALVE
Joseph T. Leighton, 5245 Topeka Drive,
Tarzana, Calif. 91356
Continuation-in-part of application Ser. No. 346,478,
Feb. 21, 1964. This application Apr. 14, 1966, Ser.
No. 549,103
5 Claims. (Cl. 137—360)

This invention relates to valve systems and particularly to a floor or wall valve for controlling the flow of gas to gas burners, such as used for fireplace log lighters. This application is a continuation-in-part of application, Ser. No. 346,478, filed Feb. 21, 1964, now abandoned for a "Gas Lighter Valve" by Joseph T. Leighton, now abandoned.

Valves for controlling gas flow to gas log lighter are known, the present invention being an improvement over prior valves. The valves will control the flow of gases, such as natural, manufactured, mixed, liquified petroleum gases and gas-air mixtures. The gas control portion of the valve is of the non-leakable type in that it is a lapped rotor tapered control element of metal seated in a metal tapered seat and loaded by spring tension to maintain a tight valve at all times. The valve is, thus, self-adjusted for any wear of the contacting surfaces, there being no packing or washers to wear and leak. The bottom of the valve casing has no opening to leak under a house or behind a wall as occurs when a spring is inserted under the valve and the opening closed by a cap.

The housing of one modification of the valve is of a standard type having an integral cylindrical portion which is internally threaded at two diameters, the lower diameter section having a threaded washer for maintaining the valve in position, while the upper internally threaded portion accommodates one end of a standard nipple. On the upper end of the nipple is threaded a flanged cylindrical floor or wall plate adapted to cover the plumbing work in a floor, and rug if used, or in a wall. The flange is finished to blend with the decor of the room. The center of the flange is open to accommodate a removable key which fits over the square end of the valve control rod.

The valves are simple in construction, pleasing in appearance, and, thus, economical to manufacture. Since various lengths of standard nipples may be used, the length or height of the valves are readily adjustable so as to accommodate different distances between a gas pipe and the surface of the floor or wall. The control key may be furnished with an extension rod which may be cut to the desired length. This simple construction may save up to 50% in installing time.

The principal object of the invention, therefore, is to facilitate the control of a gas supply to gas lighter or burner.

Another object of the invention is to provide an improved gas controlling valve for a gas lighter or burner.

A still further object of the invention is to provide a non-leakable and self-adjusting gas valve and an adjustable stem between the valve and a floor or wall plate for covering the opening in which the valve is positioned.

A better understanding of this invention may be had from the following description when read in conjunction with the accompanying drawings, in which:

FIG. 6 is a perspective view of a modification of the valve shown in the previous figures and embodying the invention;

FIG. 7 is a cross-sectional view of the valve of FIG. 6 and taken substantially along the line 7—7 of FIG. 6 but showing long connecting nipple;

FIG. 8 is a cross-sectional view taken along the line 8—8 of FIG. 7; and

FIG. 9 is a perspective view of a rotation controlling washer embodied in the invention.

Figure 1:
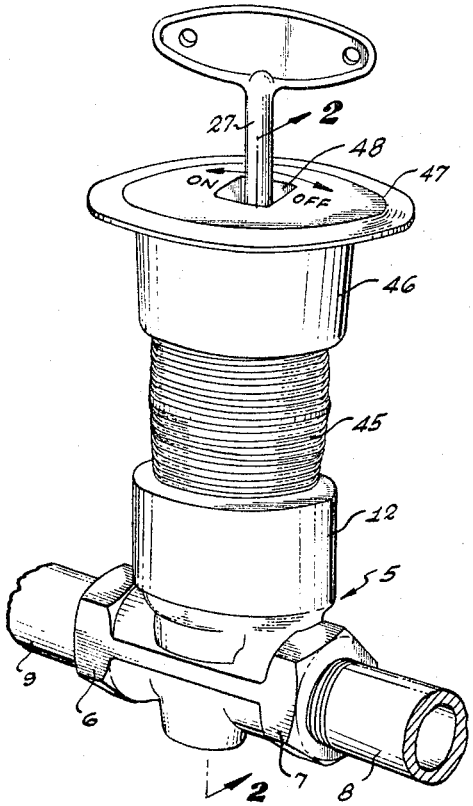
FIG. 1 is a perspective view of a valve embodying the invention.
Figure 2:
FIG. 2 is a cross-sectional view of the valve taken along the line 2—2 of FIG. 1.
Figure 2:
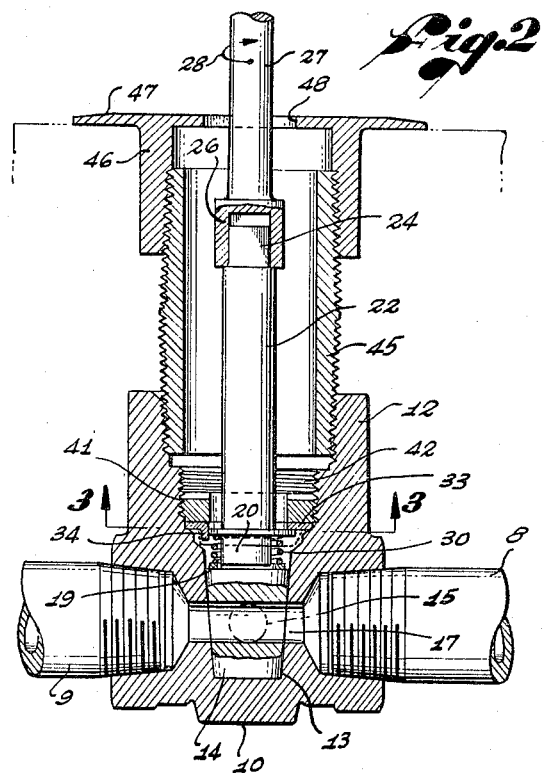

Referring, now, to the drawings in which the same reference numerals indicate the same elements, and particularly to FIGS. 1 to 5, inclusive, a valve housing 5 is composed of hexagonal end sections 6 and 7 and pipe sections 8 and 9 shown connected to the valve housing. The lower portion 10 is part of housing 5. Integral with the portion of the valve between hexagonal portions 6 and 7 is a cylindrical portion 12 having an axis at right angles to the axis of the housing 5 and which has two internally threaded diameters. Within the central portion of the housing 5 is a tapered valve seat 13 of metal in which is positioned a correspondingly tapered valve gas flow control element 14 and through which is a circular hole or opening shown in dotted lines 15 in FIG. 2. The dotted lines 15 in FIG. 2 show the valve in closed position, while the full lines show the valve in open position. The hole 15 corresponds in diameter with a hole 17 through the central portion of the housing 5. The tapered element 14 has an upwardly extending portion 19 which is slotted as shown at 20. This slot accommodates a flat end 21 of a valve stem 22, the upper end of which has a square end 24 over which may be inserted the lower end socket 26 of a key 27. Thus, rotation of the key 27, as shown by the arrow 28, will rotate the tapered valve element 14 to position the hole 15 at any desired position with respect to the hole 17 within an angle of 90 degrees.

To mainain the tapered element 14 tight in its seat 13, a coil spring 30 surrounds the slotted end 19 of element 14 and has one end abutting a shoulder of the element 14 and the other end abutting a mutilated rotation controlling flange 40 at the lower end of the stem 22. The end of stem 22 has a flat portion 21 which is accommodated in the slot 20. Cooperating with flange 40 is a washer 33 having a projection 34 extending at right angles from the plane of the washer and two peripheral projections 36 extending from the washer. The projections 36 are adapted to be accommodated in grooves 38 in the cylindrical section 12 adjacent the valve. Since the mutilated portion of the flange 40 extends over 90 degrees of the flange, this flange limits the turning angle of the stem 22 and tapered element 14 as the right angle extension 34 is positioned within the mutilated portion of the flange. To maintain tension in the spring 30, a threaded washer 41 is threaded in a threaded hole 42 in the smaller internal portion of the cylindrical section 12. The washer 41 has two parallel-sized notches diametrically opposite one another so that only needle-nosed pliers are required to service the valve without disturbing the housing.

The above valve, when turned with the key 27 in a 90-degree excursion, will open and close the valve to provide any degree of closure between the completely open an the completely closed positions. The valve is non-leakable in all positions and any wear between contacting surfaces will be compensated for by the tension of the spring 30.

Referring, now, to the remaining portion of the device, a standard nipple 45 is threaded into the cylindrical section 12 and is threaded into a cylindrical floor or wall plate 46 having a flange 47 and an opening 48 therein to accommodate the stem or the key 27.

Figure 3:
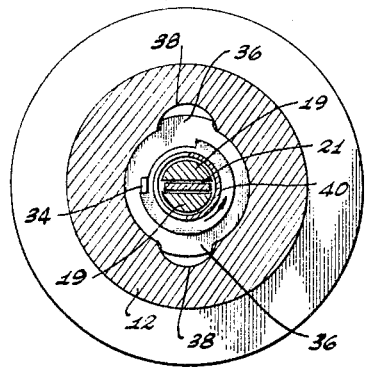
FIG. 3 is a cross-sectional view taken along the line 3—3 in FIG. 2.
Figure 5:
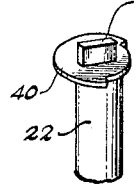
FIG. 5 is a perspective view of the lower portion of the valve control stem.
Figure 4:
FIG. 4 is a perspective view of the locking washer used in the valve.

As shown in FIGS. 2 and 3, the plate 46 is in its closest position to the valve but may be extended by rotating the cap on the nipple 45, and the nipple 45 in the cylindrical portion 12. If a shorter distance is desirable between the plate 46 and the valve, a shorter nipple may be used, and if a longer distance is desired and not possible with the nipple shown in the drawings, a longer nipple may be used. In this manner, the device may be made to accommodate differences in distances between the pipes 8 and 9 and the flange 47 which may be over a floor and over rugs of different thicknesses on the floor and walls of different thicknesses. Since standard nipples and threads are used, the installation may be made quickly at low cost. It is obvious that the key 27 may be removed after the adjustment of the valve is made as a safety factor and so that a pleasing appearance of the device is obtained.

Referring, now, to FIGS. 6 to 9, inclusive, a valve housing shown generally at 50 has hexagonal ends 51 and 52 in which pipes 54 and 55, respectively, are threaded. The housing has an upper cylindrical portion 57 externally threaded as shown clearly in FIG. 9. Adapted to be threaded onto the portion 57 is a two-diameter collar 58 having a radially inwardly extending flange 90. Into the collar 58, nipple 59 is threaded to any desired length to adjust the position of the valve in accordance with the location position of the valve with respect to a floor or wall. Threaded onto the upper end of the nipple 59 is a floor or wall plate 60 having a flange 61 and an opening 62 therein to accommodate the stem of a key 86.

Referring specifically to FIG. 7, a tapered valve seat 66 is shown spanning hole 67 in which is a tapered rotatable valve element 68, the closed position of the hole in the tapered element 68 and valve seat 66 being shown in dotted lines at 69. To maintain the desired nonleakable tension of the valve element 68 in its seat 66, a spring 70 is positioned in a socket 73 of the valve element, and a pin 74 has its ends in slots 75 in the upper end of the valve element 68. Rotation of the stem 76 permits pin 74 to rotate the valve element 68 to open and close the valve.

The cylindrical stem 76 has an upper square end 77, the lower end of the stem 76 being provided with a pin 80 with diametrically positioned ends which limit the rotation of the valve element 68 to a 90-degree rotation from "on" to "off" and vice versa when the stem 76 is rotated. Above the pin 80 is a rotational control washer 81 with a depending flange 82 and diametrically positioned ears 84. This washer is positioned in the upper end of the cylindrical portion 57, the ears 84 being positionable in notches 85 in the upper edge of the cylindrical portion 57. The depending flange 82 of the washer 81 is of a length to limit the rotation of the stem 76 to 90 degrees, which will open and close the valve 68.

To maintain the above-described elements in position, the coupling collar 58 is threaded on the cylindrical section 57 of the valve 51 and held in position by a set screw 71 with the flange 90 overlying the control washer 81 to maintain the stem 76 pressed down on the spring 70.

Nipple 59 is then threaded into the collar 58, the other end being extended in the floor or wall and threaded into wall plate 60. Thus, with different length nipples 59, the flange 61 of the floor plate 60 may be positioned at any distance from the valve 50. This construction in both modifications has an important safety feature by providing an airtight assembly of collar, nipple, and floor plate to conduct any gas leakage into the room rather than under the floor or in the wall.

In the event that the stem 76, together with the key 86, is too short, a stem extender 64, made up of a square rod having a square socket 87, may be cut to the desired length to permit the key 86 to reach the stem 76. The extender may be permanent, the socket 87 being a tight fit over square end 77.

This modification has several advantages over the modification shown in FIGS. 1 to 5, inclusive, since the interior of the valve may be easily reached by simply loosening set screw 71 and unscrewing coupling collar 58. By this construction, the valve may be easily serviced without disturbing the valve body.

Although the two modifications of the valve are for the same general purpose, the modification shown in FIGS. 6 to 9, discloses a valve with fewer parts which may be made more economically and which may be assembled and disassembled more rapidly.

Another difference is that the later modification has no substantial space between the stem 76 and the bottom of collar 58 to prevent any foreign matter, such as pipe thread compound, from reaching the actuating elements of the valve.

I claim:

1. A gas valve adapted for use within enclosed spaces having substantially no ventilation, said valve being adapted to prevent the escape of gas into such space, and being operated by a key located in a relatively well-ventilated space, the valve including:
   a housing having connectors adapted to receive inlet and discharge conduits and make a sealing fit therewith;
   a rotatable valve member between said connectors, selectively adjustable to establish or interrupt a passageway for gas from said inlet to said discharge conduit;
   a stem attached to said valve member and operable to rotate said member;
   separable coupling means attached to said housing and surrounding said stem, said coupling means and said connectors providing the only points of access to the interior of said housing;
   threaded means making a sealing fit with said coupling means and extending therefrom toward said well ventilated space;
   and a plate adapted to bear against a partition separating said well ventilated space from said space having substantially no ventilation, said plate engaging said threaded means and having an opening through which said key may extend to engage and rotate said stem, whereby, when said inlet and said discharge conduits are sealingly connected to their respective connectors, any leakage from said valve is conducted by said threaded cylindrical means to said relatively well-ventilated space, thereby preventing the accumulation of gas in said space having substantially no ventilation.

2. A valve as defined in claim 1 in which said plate is movable along the axis of said means while making a substantially sealing fit therewith, whereby said threaded means may have a length approximately equal to the distance from said housing to said partition, and said plate may be adjusted to fit snugly against said partition.

3. A gas valve comprising a housing having connectors adapted to receive inlet and discharge conduits and make a sealing fit therewith, a tapered seat in the housing, a tapered rotatable valve element mounted in said seat, said valve element having an opening therein adapted to be aligned with a similar opening in said housing when rotated to a certain position and adapted to close the opening in said housing when rotated to another position,
   said housing having a portion above the tapered seat and having a threaded portion thereon,
   an operating stem extending from said tapered valve element and in said housing portion,
   resilient tensioning means in said housing portion in engagement with said tapered valve element at one end and means on said stem at the other end for maintaining the surface of said tapered valve element in contact with the surface of the tapered seat, a washer plate received on said stem and in the housing portion above the resilient tensioning means and having a depending flange and means thereon engaging with cooperating means in the housing portion for preventing said washer plate rotation therein, holding means attached to the housing portion for holding the washer plate from moving upwardly, means on said stem and abutting the lower face of said washer for holding said stem downwardly against said resilient tensioning means and cooperating with the depending flange on said washer for limiting the rotation of said stem, a plate having a threaded portion and an opening therethrough for accommodating an operating member for said stem, threaded pipe means of different lengths threadably engaging said threaded portion of the housing portion at one end and with threaded portion on said plate at its other end for varying the distance between said plate and said housing portion.

4. A gas valve in accordance with claim 3 in which said housing portion has its threaded portion on its inside, said holding means attached to the housing portion is an externally threaded washer threadedly received in said threaded portion of the housing portion, said means of different lengths threadably engaging said threaded portion of the housing portion are externally threaded members.

5. A gas valve in accordance with claim 3 in which said housing portion has its threaded portion on its outside, said holding means attached to the housing portion is an apertured transverse web positioned intermediate the ends of an internally threaded collar, the lower internally threaded end of said collar being threadedly received on said external threaded portion of said housing portion, said means of different lengths threadedly engaging the upper internal threads of said threaded collar.

References Cited
UNITED STATES PATENTS

| | | | |
|---|---|---|---|
| 221,526 | 11/1879 | Connolly | 137—367 |
| 1,215,250 | 2/1917 | Cassidy | 137—367 |
| 1,741,983 | 12/1929 | Ellberg et al. | 251—312 X |
| 1,744,186 | 1/1930 | Wakefield | 137—364 X |
| 2,176,399 | 10/1939 | Garrett | 137—368 |
| 2,194,714 | 3/1940 | Mueller | 251—181 X |

HENRY T. KLINKSIEK, *Primary Examiner.*

M. CAREY NELSON, *Examiner.*